United States Patent [19]

Larson

[11] Patent Number: 5,594,563
[45] Date of Patent: Jan. 14, 1997

[54] HIGH RESOLUTION SUBTRACTIVE COLOR PROJECTION SYSTEM

[75] Inventor: Brent D. Larson, Cave Creek, Ariz.

[73] Assignee: Honeywell Inc., Minneapolis, Minn.

[21] Appl. No.: 250,964

[22] Filed: May 31, 1994

[51] Int. Cl.$^6$ ........................................ G02F 1/133
[52] U.S. Cl. ...................................... 349/74; 349/96
[58] Field of Search ........................... 359/40, 42, 53, 359/63, 631, 634

[56] References Cited

U.S. PATENT DOCUMENTS

| | | | |
|---|---|---|---|
| 4,632,508 | 12/1986 | Connelly | 359/631 |
| 4,870,268 | 9/1989 | Vincent et al. | 359/634 |
| 5,032,007 | 7/1991 | Silverstein et al. | 358/335 |
| 5,105,265 | 4/1992 | Sato et al. | 358/60 |
| 5,184,234 | 2/1993 | Mathewson | 359/53 |
| 5,250,967 | 10/1993 | Miyashita | 353/38 |
| 5,293,271 | 3/1994 | Merritt et al. | 359/631 |
| 5,381,278 | 1/1995 | Shingaki et al. | 359/63 |
| 5,408,346 | 4/1995 | Trissel et al. | 359/629 |

FOREIGN PATENT DOCUMENTS

| | | | |
|---|---|---|---|
| 90250300 | 6/1991 | European Pat. Off. | G02F 1/1347 |
| WO9215918 | 9/1992 | WIPO | G02F 1/13 |

*Primary Examiner*—Sara W. Crane
*Assistant Examiner*—Fetsum Abraham
*Attorney, Agent, or Firm*—Kenneth J. Johnson; John G. Shudy, Jr.

[57] ABSTRACT

A color projector for forming a high resolution image through a plurality of stacked display panels. The projector employs subtractive color technology to project a real or virtual color image. In order to provide a highly focused image free from parallax effects, a dichroic mirror assembly is provided to reflect the light exiting the display panels and compensate for differences in optical path lengths between display panels while maintaining high resolution focusing capability. Light output averaging means are provided to eliminate additional parallax effects. High resolution optics are provided between the dichroic mirror assembly and the projection screen in order to provide focus for the image.

32 Claims, 14 Drawing Sheets

HIGH RESOLUTION SUBTRACTIVE COLOR PROJECTION SYSTEM

FIELD OF THE INVENTION

This invention relates to color image projectors and more particularly to image projectors which employ high resolution subtractive color liquid crystal display (LCD) technology.

BACKGROUND OF THE INVENTION

With the growing use of computers, image projectors which employ liquid crystal technology are becoming a more popular way to display information on a large screen. Head-mounted display devices are also becoming viable options for an increasing variety of applications. Many of these projectors are comprised of an illumination source, one or more liquid crystal panels with multiple pixels to form an image, and optics to either focus the image as a real image on a screen or to collimate the image for viewing as a virtual image display. Resolution and image quality requirements for color displays such as these continue to increase.

In order to provide color without corresponding loss of resolution, a projector may employ subtractive color imaging. Subtractive color is a well established approach in other imaging technologies, notably color photography and color printing. In a subtractive color display, individual LCD panels or other image sources are stacked upon each other and a white light spectrum is incident upon the stack. Portions of the visible spectrum are selectively subtracted at each LCD panel in order to generate the desired color. The portion of the spectrum which is subtracted is either absorbed or reflected back towards the illumination source. The stacked LCD panels are arranged to be coincident with the light beam so that the image projected is a composite of the images formed by the three panels and that corresponding color pixel elements are aligned in the projected image.

The quality of the subtractive color image is a function of many parameters. Color quality can be excellent but is highly dependent upon the specific color producing mechanisms employed. Achievable pixel count is generally determined by the multiplexing ratio at which adequate contrast and gray scale performance can be achieved. Pixel density, for example in lines per inch (lpi), is limited by the type of LCD approach, the multiplexing ratio for a given size display, and the ability to make reliable drive connections to the display panels.

The stacked nature of a subtractive color projector results in special optical and geometric considerations. With most current display technologies, individual layers cannot be made negligibly thin in the way that photographic and printing color layers can. This introduces special system requirements, such as the need to simultaneously focus three separate color planes and to eliminate parallax problems. Maintaining adequate resolution in the projection system is critical to the competitiveness of the subtractive color approach. In addition, compactness and system stability are important as these are areas in which the subtractive color approach offers key advantages over alternative color display methods, especially for such critical form factor applications as head mounted displays. Yet another key area is minimization of the cost of such a display. In order to justify use of three panels instead of one, the fabrication cost of each must be held to a minimum.

The conventional optical approach to viewing or projecting a subtractive color image is the use of relatively directional or collimated light. Directional in this case can be taken to mean that the angle subtended by the illumination is on the order of the angles spanned by the set of rays passing through each of the corresponding color elements for a given full-color picture element, or pixel. In the case of a hardcopy pixel, such as in a photograph or color thermal transfer image, the layer separation is much smaller than the pixel size, and hence diffuse light can be used. In a typical subtractive color display (see for example U.S. Pat. No. 44,917,465), which might be implemented on an overhead projector using Fresnel lenses and three large light valves, the light is sufficiently directional if the depth of field is sufficient to keep all layers in reasonable focus. In that case, a telecentric configuration makes the magnification equal for all layers, or alternately individual light valves of different sizes can be used. The situation becomes more complicated, though, as the light valve gets smaller, and higher performance is desired.

Although the liquid crystal panels are relatively thin, the individual LCD panels are still located at different distances from the screen upon which the image is projected. With these differences in distance, difficulties arise in focusing the three images at the same time upon a single surface. At high resolutions, where the pixel pitch is significantly smaller than the layer separation, the directional or collimated approach becomes troublesome. The small numerical aperture allowed by constraining light rays to pass through all corresponding color elements constrains both the light throughput for practical light sources and the achievable resolution due to the diffraction limiting aperture effect. Hence it becomes impossible to achieve adequate performance over a single depth of field range using the directional or collimated approach, having a detrimental effect upon the quality of the projected image.

One arrangement which overcomes some of these difficulties consists of a stacked dichroic flat mirror assembly positioned in the path of the projected image (U.S. Pat. No. 5,184,234). The layers of the dichroic mirror assembly selectively reflect the red, green, and blue images generated by the individual LCD panels. The individual mirrors of the mirror assembly are spaced so as to correspond to the spacing between LCD panels. The dichroic mirror assembly is selected such that the first dichroic mirror surface reflects light modulated by the liquid crystal panel that is most remote from the mirror assembly, and passes the remainder of the light beam substantially unaffected. The middle dichroic mirror surface is selected to reflect the image generated by the middle liquid crystal display panel and to pass at least the image light which corresponds to the closest LCD panel. The final reflecting surface is a mirror that will reflect all spectral energy, though only the image formed by the last LCD panel should reach this surface. In conjunction with an imaging lens and a screen, this arrangement provides a color projector with equal path lengths between the LCDs and the image surface, so that the three images can simultaneously be focused on the image surface by the optics.

The arrangement described above has many disadvantages for demanding display applications, such as those utilizing compact miniature AMLCD subtractive color light valves. These light valves are being extended to increasingly higher densities of 500–2000 lpi and beyond, with thousands of pixels on a side, and likely incorporating integrated row and column drive electronics. Unless a completely collimated backlighting arrangement is used, the dichroic mirror assembly of the prior art acts as a tilted slab in the divergent display optical path. As light strikes the surface of the assembly it is refracted due to the different medium. Optical aberrations such as astigmatism and coma are introduced. Further, due to the nature of the mirror stack, the severity of these aberrations is strongly wavelength dependent. This can significantly compromise the performance of an otherwise well corrected system, and require additional complexity in the projection optics if a high resolution display is desired or if high light collection efficiency is needed. In certain desirable configurations, the new aberrations introduced by this arrangement can be nearly as limiting to high resolution performance as the path length differences it is designed to compensate for. Further, complexity is added to the arrangement by the need to provide and maintain proper alignment between the mirror assembly and the LCD panels.

Another drawback of the prior art described above is the requirement for lateral offset between the LCD panels. The clear, or "transparent" areas of each panel must thereby be increased to minimize vignetting or change in image quality in the associated non-overlapped regions. This increase in area can impact the image quality and display panel size, and hence may introduce cost, yield, or other considerations. As an example, assuming the geometry described in U.S. Pat. 5,184,234, and three identical LCD matrix panels with a reasonable separation of 1.5 mm between adjacent active layers, the added dimension would be twice the separation (thickness) between the first and last panels, or 6 mm. An array with a smaller effective pixel size could be used rather than physically increasing the device area, however for a deliberately compact and high resolution light valve, this is not desirable. This is especially true in the case of miniature active matrix substrates which might be fabricated using standard IC processes and design rules. When incorporating bus lines, active elements such as thin film transistors (TFT's) and integrated row and column drive electronics on the substrate, this added dimension could represent a very significant size increase, decreasing the number of devices per wafer, decreasing the device yield, increasing the cost, increasing package size, and possibly increasing the cost and complexity of the photolithography system required.

Yet another disadvantage of the projectors of the prior art is the susceptibility to aliasing, or Moiré artifacts caused by spatial interference between the pixel grid structure of the individual, stacked imaging devices. In the case of an active matrix LCD, which is generally preferred when maximum performance is required in terms of pixel count, density, grayscale, contrast and response time, the grid structures are typically opaque and can be quite significant. The Moiré artifacts are essentially parallax effects similar to the parallax seen between the modulated image layers, except in this case comparable grid structures subtract light of all wavelengths in all layers. This restricts the effectiveness of the prior art to either highly directional illumination or to devices without appreciable opaque grid structures, such as passively multiplexed twisted nematic LCDs, including super-twisted nematics.

SUMMARY OF THE INVENTION

It is, therefore, an object of the present invention to provide a liquid crystal display (LCD) color projector which provides high resolution real or collimated images.

It is a further object of the present invention to enable the use of active matrix liquid crystal displays (AMLCD's), or other transmissive displays having a matrix or grid structure, in a subtractive color arrangement.

It is a further object of the present invention to provide a compact and stable LCD projector which simultaneously focuses stacked spectrally non-overlapping image source layers and eliminates parallax effects between the layers.

It is still a further object of the present invention to provide a low cost LCD color projector which minimizes the required projection optics complexity, minimizes the size and subsequent cost of the subtractive color layers, provides for relaxed tolerances on the projector assembly and allows efficient use of inexpensive, non-collimated illumination sources.

It is yet a further object of the present invention to provide a subtractive color matrix-addressed projector without objectionable Moiré-type aliasing artifacts.

These and other objects are provided by the present invention by combining a light source with a plurality of stacked liquid crystal display panels, and optics to focus a color image as a real image on a screen, or alternatively to collimate the image for virtual image viewing. Light projected through the LCD panels is modulated while passing through the individual pixel sites to form a color image. The modulated light exiting from the panels is reflected by one or more dichroic mirror stacks. The images are reflected according to color, and the mirror positions are adjusted to account for the thicknesses of the stacked LCD panels. The optical path is laid out to provide a minimum of optical aberrations in the mirror stack(s) to be corrected for in the projection optics. This is achieved by elimination of isolated tilted interfaces between air and refracting media in the presence of diverging image rays. In one embodiment, the reflecting mirrors are immersed in a comparable refracting medium having entrance and exit faces which are for the most part normal to the axis of the optics. In another embodiment, mirror assemblies are used in complementary pairs to provide suppression of one or more aberration types.

Aliasing, or Moiré artifacts resulting from the stacked grid structure are eliminated by controlling the periodicity of the angle-varying geometrical interference fringes and by averaging over multiple fringes. This is done by relating the collection angle of the projection and viewing optics with the ratio of the active layer separation to the light valve pitch, and constructing the subtractive stack and optics according to prescribed relationships. In the case of a collimated configuration, the pupil aperture of the viewer's eye is also considered.

Selected embodiments provide means for improving the stability, functionality and cost of incorporated components and subsystems.

DESCRIPTION OF THE PREFERRED EMBODIMENTS

Figure 1:
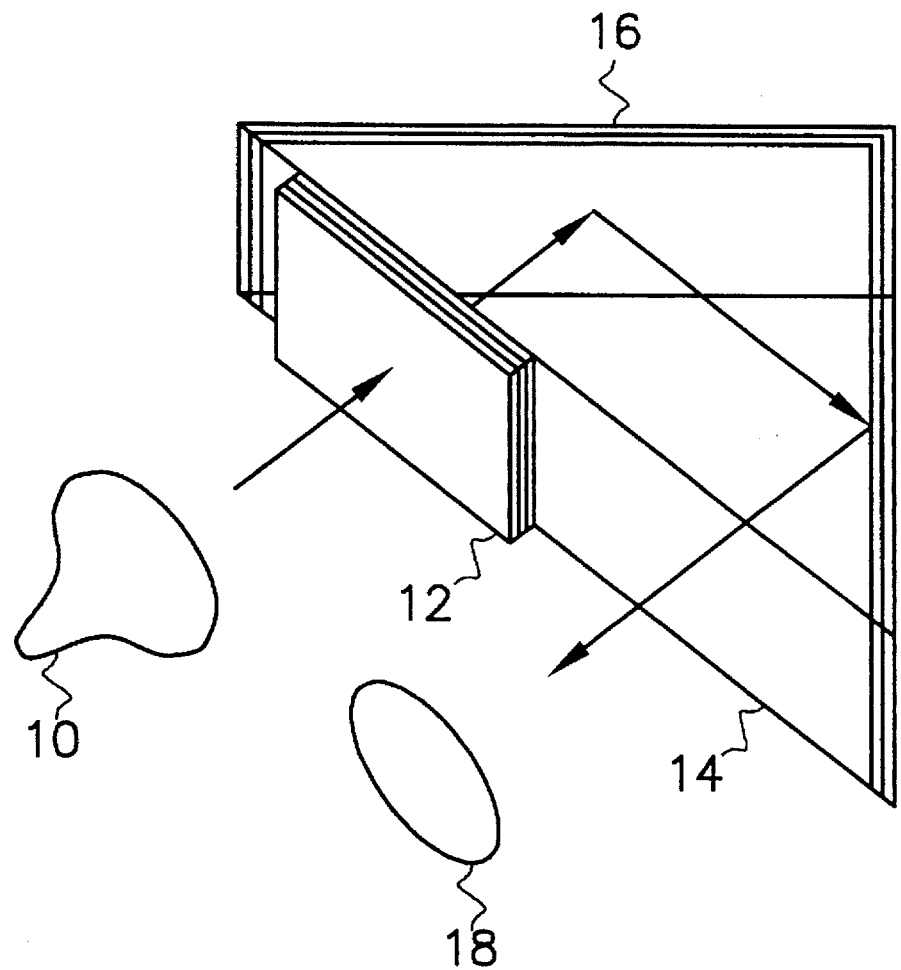
FIG. 1 is a 3-dimensional view of the first embodiment of the color projector.

Disclosed in FIG. 1 is a 3-dimensional view of an embodiment of the color projector described herein. All embodiments of the invention contain some common components which are best illustrated in FIG. 1. Included in the projector is the light source 10 which may include a reflector (not shown) in order to produce an illumination beam. The light source 10 emits white light which impinges upon LCD assembly 12. The LCD assembly 12 includes three separate liquid crystal display panels. Each display panel acts to selectively filter a particular spectral component from the white light emitted by light source 10. In the embodiments disclosed herein, the LCD panels act to filter red, green and blue light, however, this is not meant as a limitation on the subtractive color process. In the embodiment of FIG. 1, the LCD panel assembly contacts prism 14. The prism is constructed of a clear material of a known index of refraction. Light from the LCD panel assembly enters the prism without further refraction. Along two sides of the prism 14 is dichroic mirror assembly 16 which reflects light transmitted through the LCD panels. The reflected light passes out of the prism and through projector optics 18. The projector optics 18 focuses the image on a remote viewing screen. The optical collection angle of optics 18 and the spatial relationships within the LCD panel stack are adjusted to average over the spatial and angular Moiré pattern, which will be described in more detail below. Optics 18 as shown in FIG. 1 is a representation of a conventional multi-element display lens. This type of lens apparatus is well known in the art.

FIG. 1 also describes a preferred embodiment of a virtual image display, such as might be used in a head mounted display application, if the lens is designed and positioned to approximately collimate the displayed image. Collimation of the image would correspond to placing the screen at or near infinity or beyond (slightly divergent rays). The projected display would then be viewed directly by the eye, without an intervening screen.

Figure 2:
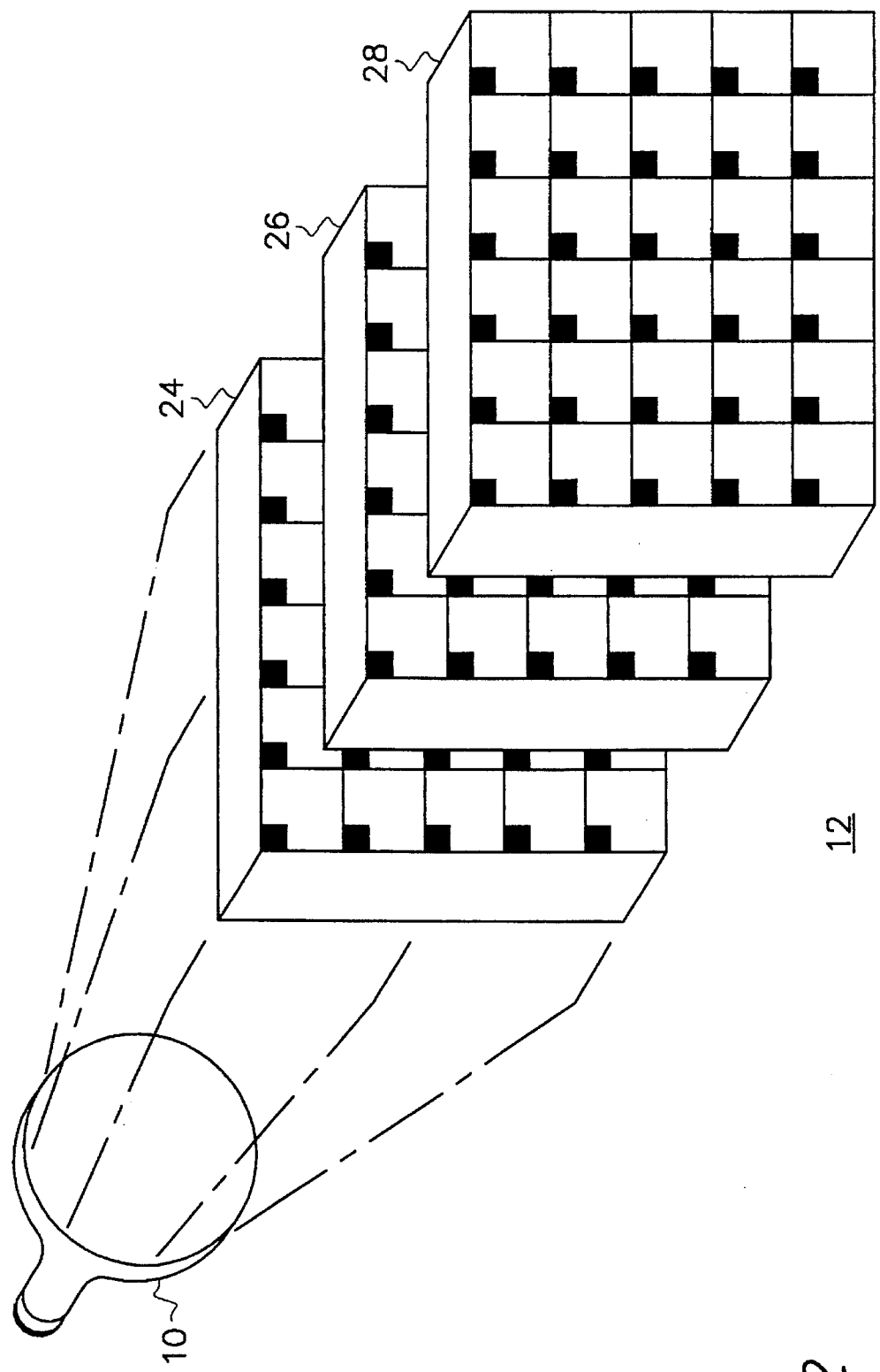
FIG. 2 is an exploded view of the LCD panel assembly.

A more detailed view of the LCD panel assembly 12 is shown in FIG. 2. This assembly is comprised of the individual LCD panels 24, 26 and 28. In order to generate a color image, this type of LCD panel assembly employs the process commonly known in the art as subtractive color. Each panel is a color filter for a particular color. In the embodiments described herein, the colors are red, green and blue although other combinations are conceivable. Within the panel is a high density matrix of picture elements, which control the transmission of light. Each picture element in the panels selectively passes or filters a particular color. In this embodiment of the invention, the yellow cell 24 selectively filters blue light, the cyan cell 26 selectively filters red light, while magenta cell 28 selectively filters green light. Desired color combinations are displayed by manipulating the picture elements in each LCD panel. A major advantage of this type of subtractive color is that much higher full-color image resolution is achievable in comparison to the electronic color tillers which use the additive approach incorporating a color filter array.

A principal challenge addressed by the embodiments described herein is overcoming parallax effects to achieve high image quality performance with a stacked subtractive color arrangement of display panels. In other words, the spatial separation of the LCD panels makes the displayed image a function of the line of sight. While parallax effects can of course be avoided by selecting a single line of sight, as is the case with the conventional projection approach using highly directional or collimated light, this can be impractical in many scenarios, especially as the ratio of separation to picture element size becomes large. Typically a cone of light rays is preferable. Among its advantages are that it provides for high light collection efficiency from practical sources, increases the diffraction limited resolution in the case of a high resolution display, and obscures any structures which are not at the desired image plane. In addition, the cone of light rays passing through the display may vary as a function of position within the display, or as a function of viewing position as is typically the case with viewing of a virtual image display. In these situations; parallax effects must be eliminated or compensated for.

These parallax effects can be further broken down. One type of parallax effect occurs when separate layers in a subtractive color stack function independently, each on its own wavelength band. In this case, which represents the desired operation of the display, the resulting images are independent, but vary in position. In the preferred embodiments, this type of parallax effect is eliminated in two basic ways. The first is the incorporation of path length compensation means between the display panels and a subsequent projection optical system. The second way described herein utilizes a plurality of wavelength-selective optical systems in a stacked geometry. The invention described herein accomplishes both of these by using spatially offset, spectrally selective mirrors to compensate for separation of the subtractive layers.

A second type of parallax effect occurs when the display panels are non-ideal, and are not completely independent in their modulation wavelengths. This can occur due to spectral overlap or crosswalk in the modulation mechanisms, for example due to non-ideal polarizers in a subtractive color LCD system. Another spectral overlap mechanism is the presence of opaque structures within the LCD panel, such as might be used in a row and column addressing structure for active matrix devices, and which results in periodic aliasing or Moiré-type artifacts. These are the parallax effects which are controlled by defining the optical collection angle of optics 18 and the spatial relationships within the LCD panel stack to ensure that any spatial and angular Moiré patterns are averaged away.

The embodiments presented herein provide methods for eliminating both of these types of parallax effects while maintaining other desirable properties of the individual display panels, such as high resolution capability and compact size.

Figure 3:
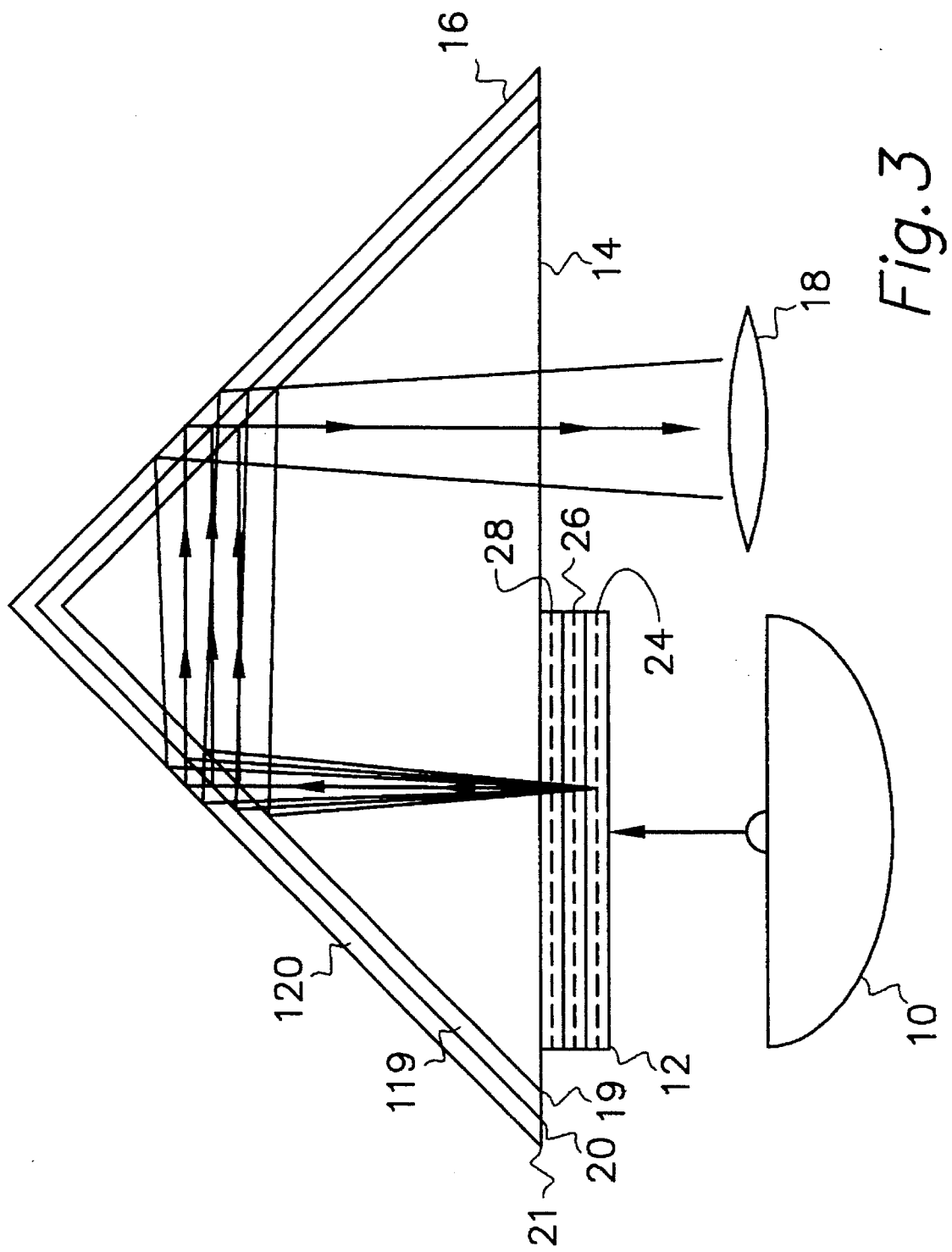
FIG. 3 is a top view of the first embodiment of the color projector.

In FIG. 3, a top view of the first embodiment is shown. This particular view will provide a better understanding of the operation of the color projector. As described above, light is transmitted from light source 10 to the LCD assembly 12 which then filters the lights so as to form blue, red and green images. In general, for the first and each subsequent embodiment, each pixel of the images generated will have associated with it a cone of light as depicted in FIG. 3. The images all have different optical path lengths as the light enters the prism 14. In prism 14 the light is reflected by dichroic mirror assembly 16. The dichroic mirror assembly 16 is made-up of three different mirrors 19, 20 and 21. In order to equalize the path lengths and thereby reduce parallax effects, different portions of the color image spectrum are reflected by the different mirrors. In this embodiment, light filtered at yellow cell 24 is reflected by mirror 19, while light filtered at cyan cell 26 is reflected by mirror 20, and finally light filtered at magenta cell 28 is reflected by mirror 21. Mirrors 19, 20 and 21 are parallel and have the appropriate separation as to provide path length correction for blue, red and green light. By the time the light exits the prism 14 and travels through the optics 18, all three colors of light will have equal optical path lengths. In this first embodiment, the mirrors are offset a distance $d/2\sqrt{2}$, where d is the spacing between the active layers of adjacent LCD panels.

Use of the prism in this manner significantly reduces the optical aberrations which are otherwise introduced by the presence of the tilted refracting mirror stack. When used in the presence of converging or diverging ray bundles, such tilted elements introduce asymmetries, leading to aberrations such as astigmatism and coma, which can be difficult to eliminate later on, especially when the thickness of the element is discretely wavelength dependent. While use of the prism can lead to other effects such as spherical or chromatic aberrations, the lack of tilt on the refracting surfaces makes these effects more symmetric and much easier to control in the subsequent optics 18. While this embodiment shows cell 28 in direct contact with prism 14, comparable performance is achieved by introducing an air gap between the two elements, provided that the surfaces remain parallel and non-tilted with respect to the imaging layers. By non-tilted, we mean that the direction corresponding to the normal or symmetry axis of a surface or interface is perpendicular to the display panels after having been folded by any reflective surfaces along the optical path between them. As such, the surface of prism 14 where the light exits the prism is also non-tilted with respect to the display panels.

In addition to the elimination of refractive effects and subsequent resolution limiting aberrations by incorporating mirror assembly 16 into prism 14, the use of two reflections in this manner eliminates any need for the lateral offset in the LCD panels which enhances the compactness of the color projector. This is also desirable because the size of the LCD panels is kept small and thus easy and less costly to manufacture.

Also shown in the first embodiment are absorbing color filter means 119, and 120. Filter means 119 in this embodiment is yellow, absorbing blue light preferentially and passing red and green light. Filter means 120 absorbs red light and passes at least green light preferentially. Including these absorbing filters significantly relaxes the tolerances on the wavelength selective mirrors 19, 20 and 21. Rather than demanding complete spectral purity, i.e. complete reflectance in the reflection band and zero reflectance in the non-reflecting bands, much less costly performance can be tolerated. Mirror 19 must still have very low reflectance for red and green, but some falloff in reflectance for blue is acceptable. This allows many fewer layers, for example, in the case of a discrete or gradient multilayer dielectric mirror. Alternately, if a conformal volume holographic mirror is used, such as might be constructed with dichromated gelatin, diffraction efficiency can be less than perfect. Yet another dichroic (wavelength selective) mirror would be a birefringent cholesteric structure, such as a crosslinked cholesteric liquid crystal silicone, which would also benefit from relaxed reflectance requirements. Continuing further into the mirror stack with the absorbing filters included, the red-reflecting mirror would need to have low reflectance for green, but only partial reflectance in the red is required. Mirror 21 would only require partial reflectance in the green band. Of course, system throughput would depend upon maintaining high reflectance where such performance is cost effective.

While it is preferred from an optics simplicity standpoint, as well as an alignment and stability perspective, that prism 14 represent a medium with a refractive index comparable to that of both the LCD panel substrates and the mirror substrates, such as glass, acrylic or other similar optical material, the configuration shown in FIG. 3 presents significant advantages over the prior art even if the intervening space is air-filled. The benefit of requiring no lateral offset (as compared to the configuration in FIG. 6) in the LCD panels remains. In addition, some (though not all) of the optical aberrations introduced by the use of tilted filters are reduced by the complementary arrangement suggested by FIG. 3 without prism 14.

Figure 4:
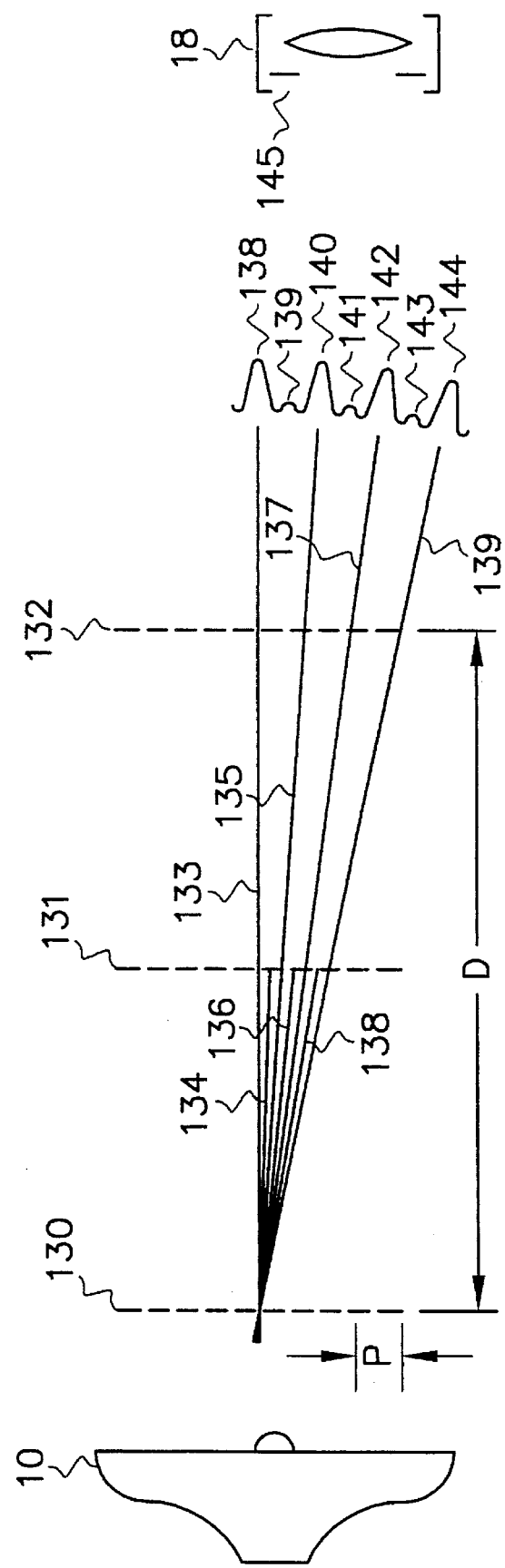
FIG. 4 details the origin of Moiré artifacts and a preferred embodiment for elimination of these artifacts.

As the resolution and pixel count of LCD panels are increased to provide higher levels of display detail and image quality, it is common to incorporate some type of opaque matrix structure into the panels. These matrix structures impose additional grid-pattern image modulation which is not in general eliminated by the stacked mirror path length compensation mechanism. These slacked grids can form dramatic Moiré or aliasing artifacts. These fringes are angular Moiré effects in general, but with relatively directional light they appear similar to traditional spatial Moiré patterns, much like the aliasing observed when viewing through multiple window screens. FIG. 4 depicts the origin of these geometric artifacts and a preferred embodiment for elimination of the same.

Referring to FIG. 4, light source 10 illuminates the stacked LCD panels. For clarity, only the opaque matrix structures of each panel are shown, matrices 130, 131 and 132 respectively. The pixel pitch, pixel aperture and layer separations are taken as being uniform and equal among all three panels for clarity of example in this embodiment, but are not constrained in this way for a real system. The geometric angular fringes are shown as fringes 138 through 144. For this three layer stack of matrix structures, the major fringe peaks 138, 140, 142 and 144 are the result of rays such as 133, 135, 137 and 139, respectively, which pass through the active aperture of pixels in all three layers. The intermediate peaks 139, 141 and 143 correspond to rays such as 134, 136 and 138, respectively, where these ray bundles passing through apertures in the first and third matrix structures are partially eclipsed by the matrix 131. Whereas this description is representative of the origin of the fringes, the details are quite dependent upon such parameters as the pixel pitch, aperture pattern, separation, lateral displacement, rotation angles and other geometric factors. These have been modeled numerically for a number of configurations.

Since these peaks are truly directional in nature, we can now readily analyze the method of collimated illumination as used in the prior art. By collimating the light, we choose only a single angle over the entire display area. Hence, the Moiré fringe amplitude is uniform and is represented by the peak 138, for example in the case of telecentric viewing. The disadvantages of this approach, as pointed out earlier, include diffraction limiting of the projected image resolution as well as the low efficiency achieved by discarding all the other fringe contributions, including peaks 139 through 144 and many more not shown in the figure. In the embodiments of the invention described herein the collection aperture 145 of the projection optics 18 is increased to include multiple fringes. In an actual assembly, optics 18 will in general be situated further away than suggested by FIG. 4, and would have its aperture 145 scaled proportionally with the distance so as to maintain the desired collection angle. It is also beneficial in some ways to retain a telecentric geometry or other geometry in which the optical collection angle is constant across the panels, such that the same fringes are collected from each point on the display, although this is not necessary if enough fringes are integrated such that sliding the angular aperture window yields visually acceptable uniformity of the collected optical energy. For the example in FIG. 4, the Moiré fringe periodicity in the medium is at approximately 2p/D radians, where p is the linear pixel pitch and D is the separation between the first and last layers. In the situation where air is the transmission medium after leaving the light valves, this is scaled up by the refractive index n of the light valve stack medium, to 2np/D. Taking the minimum collection angle to be twice this angular separation, and a yield on the order of four fringes in the aperture, we can calculate the required minimum numerical aperture (NA) to be approximately 2np/D as well. Assuming significant magnification in projection, this corresponds to an f/# of 1/(2*NA) or approximately D/4np. For a specific example, using n=1.5, 200 lpi and total separation of 0.060", best Moiré averaging would be obtained with an f/2 or preferably faster (smaller f/#) lens. At 1000 lpi and a total separation of 0.030", an f/5 or faster lens is required.

We can apply this type of Moiré averaging to a head mounted type of display, where the defining collection aperture is likely to be the pupil of the eye. Assuming the eye pupil to be 5 mm and, for example, a 50 mm focal length for the collimation optics gives us an f/10 viewing geometry. The ratio D/p should therefore be 4n*10=60 or greater. With 1000 lpi on the LCD panels, the formula can be reversed to yield a total layer spacing of no less than 0.060" to achieve the Moiré averaging object of this invention.

The performance of this system can be further enhanced, although with other system ramifications, by reducing the amplitude of the fringes. Assuming a fixed aperture size and pixel pitch, the amplitudes can in general be reduced by slightly misaligning the panels with respect to each other, either translationally or orientationally. For example, the middle panel of a three panel stack can be translated a fraction (perhaps 25%) of the pixel pitch. Such a misregistration can reduce the fringe amplitudes and may be acceptable in other respects.

Figure 5:
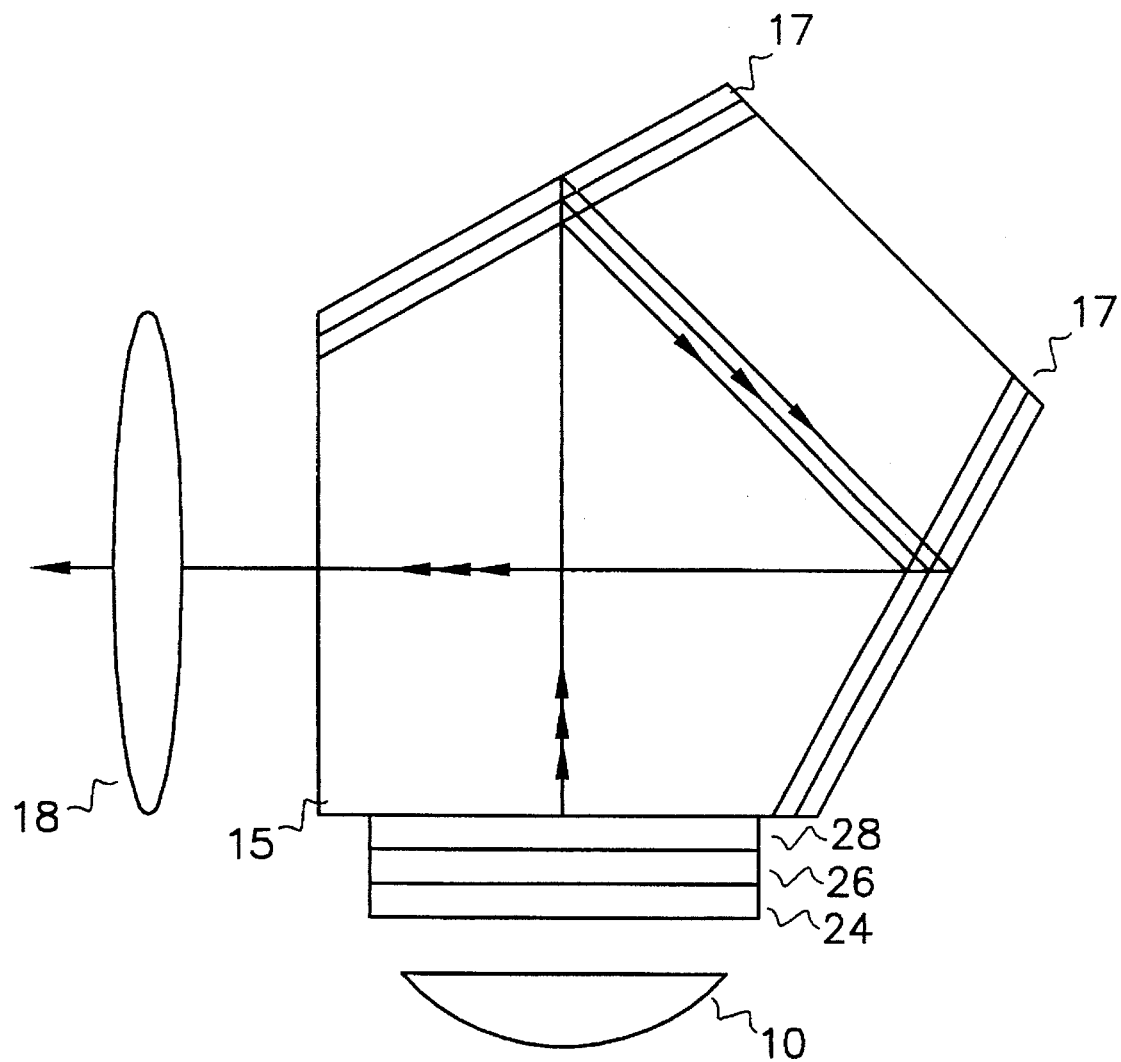
FIG. 5 is a top view of the second embodiment of the invention.

FIG. 5 discloses a second embodiment of the invention. In this embodiment, which is similar in its symmetry with the embodiment of FIG. 3, the prism 15 has additional sides and the folding angles have been changed to bring the merged image out a separate side. The dichroic mirrors 17 span two of the five sides. This is a particularly advantageous folding scheme where, for example, the image source assembly is sufficiently large, for example due to interconnects, integrated drivers or backlight structures, to obscure the projection path shown in FIG. 3.

Figure 6:
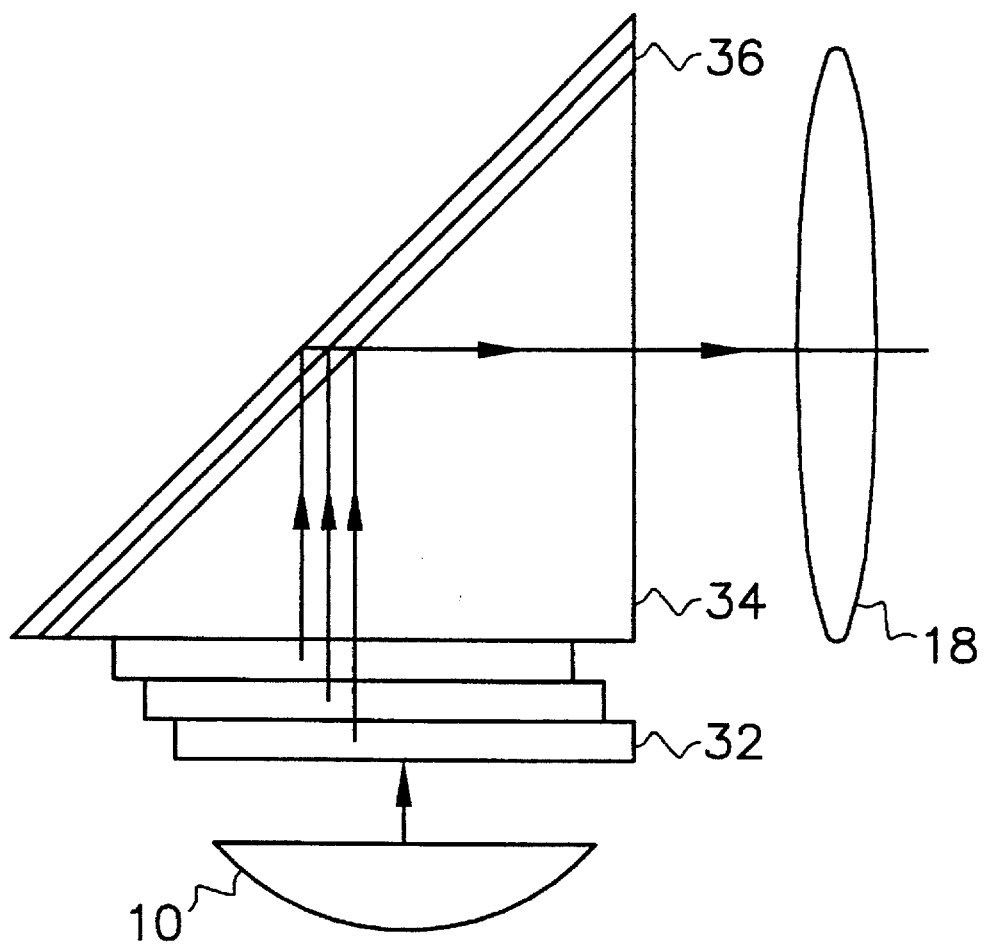
FIG. 6 is a top view of the third embodiment of the invention.

FIG. 6 discloses a third embodiment of the invention. In this embodiment, the LCD assembly 32 is configured differently from LCD assembly 12 shown in FIG. 3. In LCD assembly 32 the individual panels are offset with respect to each other so as to provide proper alignment of the image once it is reflected by the mirror assembly 36. The LCD assembly 32 is parallel to the surface of prism 34, for example in direct contact, and light which is filtered in the assembly 32 enters prism 34 at such an angle as to eliminate any further refraction. The red, green and blue components of light are then reflected by mirror assembly 36. The spacing of the mirrors is at d/√2, where d is the separation between adjacent subtractive layers. The reflection of the mirrors compensates for the optical path length differences and the light exits prism 34 without any further refraction by tilted interfaces and passes into optics 18 and is displayed. This embodiment of the invention offers an advantage over previous color projectors in that it allows a simpler and more compact form for optics 18. While a small amount of spherical or chromatic aberration may be introduced, the more troublesome color-dependent astigmatism and coma associated with a tilted element in a divergent beam is avoided, especially when resolution and light collection requirements are high. Further, integrating the mirrors into the prism simplifies the task of precisely aligning and maintaining mirror position relative to the LCD panels where even the slightest error can cause significant image clarity problems.

Figure 7:
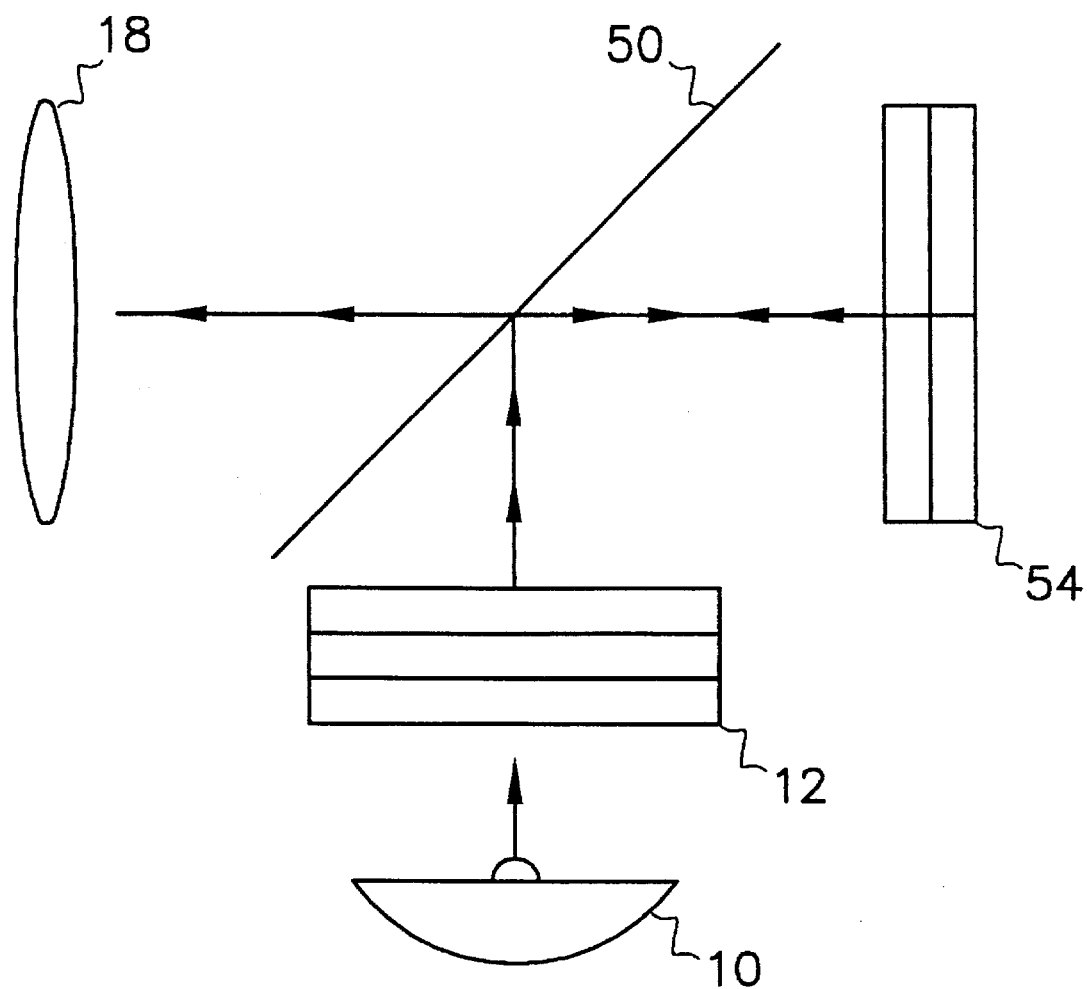
FIG. 7 is a top view of the fourth embodiment of the invention.

FIG. 7 discloses a fourth embodiment of the invention. In this embodiment, a beamsplitter is positioned in the optical path to manipulate the image. In the most basic form of this embodiment, the light source 10 transmits white light through the LCD panel assembly 12 which filters the light to form an image. At beamsplitter 50, a portion of the image light is reflected in the direction of mirror assembly 54. As with the former mirror assemblies, there are three dichroic mirrors, each reflecting a particular portion of the visible spectrum. The separation between the mirrors in the mirror assembly compensates for the optical path length differences caused by the thicknesses of the panels in LCD panel assembly 12. Light reflected from mirror assembly 54 then passes again through beamsplitter 50 to optics 18. In this embodiment as described no offset is required between the panels in the LCD panel assembly 12 and only one set of mirrors 54 provides for a very compact color projector.

Figure 8:
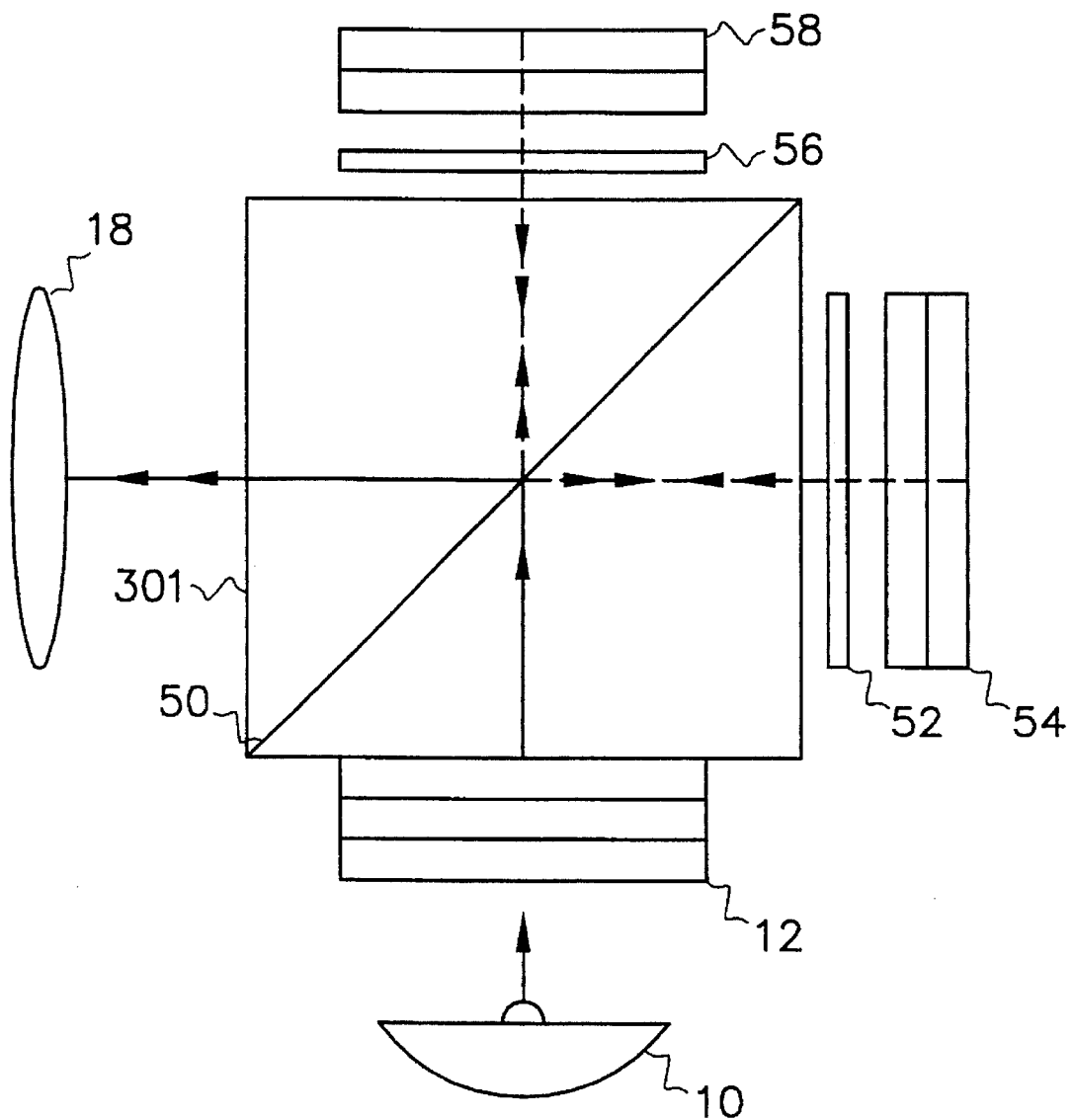
FIG. 8 is a top view of the fifth embodiment of the invention.

Several additional optional elements are shown in the fifth embodiment in FIG. 8, which may be used selectively in combination with those already identified in FIG. 7 to improve upon the performance of the basic embodiment shown. While beamsplitter 50 is shown as being very thin, such as could be achieved by using a pellicle (membrane) beamsplitter, a thicker beamsplitter could be used. To avoid the aberrations associated with the thicker beamsplitter, it can be immersed in the optional cube prism 301 as shown. If the stacked image source has appropriate polarization properties, beamsplitter 50 may be a polarizing beamsplitter, such as could be fabricated with multilayer dielectric or cholesteric films. In the case of a linear polarizing beamsplitter, quarter wave plate 52 is included to improve the transmission efficiency of the embodiment. Yet a further variation is obtained by including second mirror stack 58 and optional quarter wave plate 56 to retain even more of the light passing through the LCD panels. By including all of the optional elements, as shown, the efficiency losses otherwise associated with the beamsplitter can be eliminated, even for arbitrary polarization states in the generated image.

Figure 9:
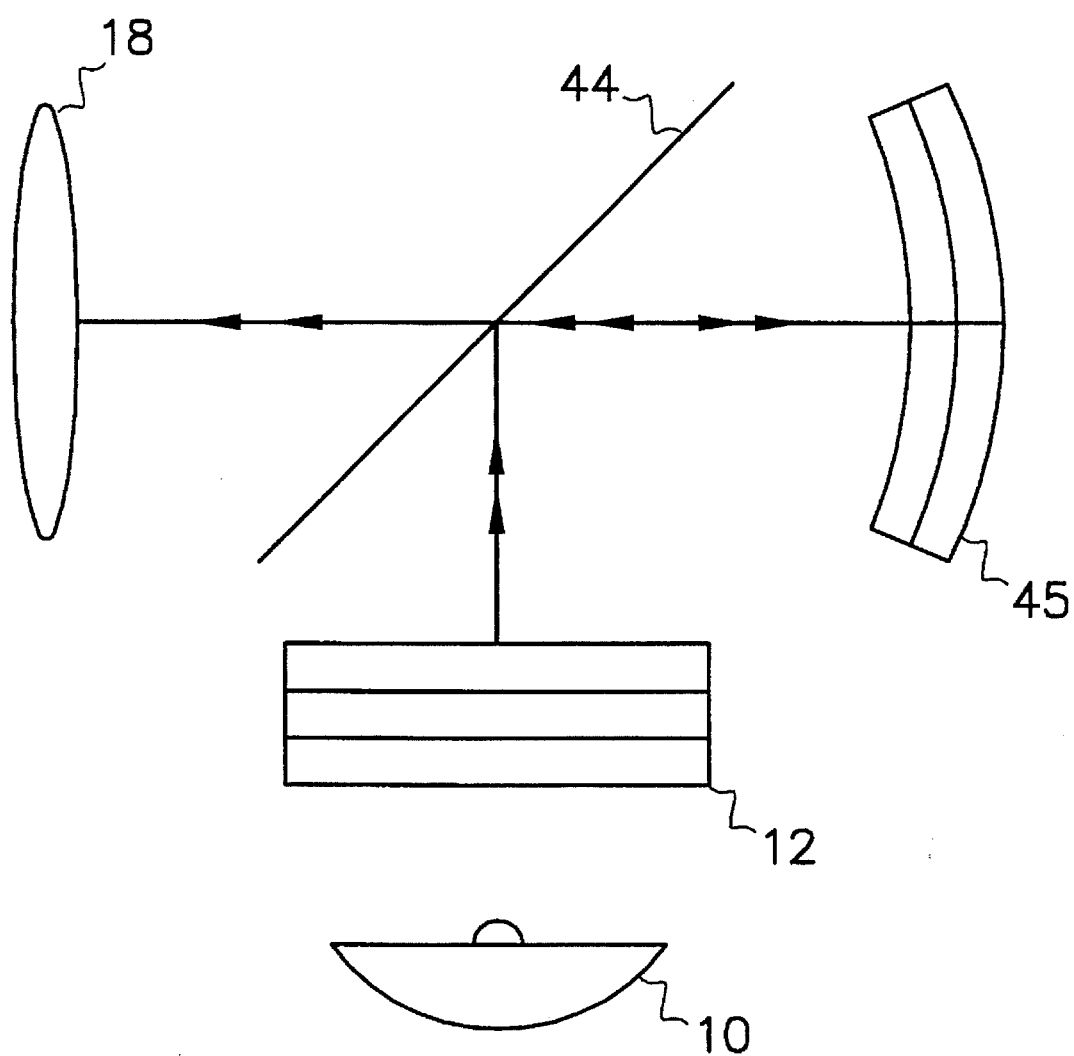
FIG. 9 is a top view of the sixth embodiment of the invention.

As shown in FIG. 9, the fourth embodiment can be further adapted to form a sixth embodiment, including mirrors with optical power, such as mirror assembly 45. A portion of the light transmitted through LCD assembly 12 is reflected by beamsplitter 44 to the mirrors 45. In the embodiment shown, mirrors 45 are spectrally selective and approximately collimate or focus the image for each of the spectral components. The reflected light is then partially transmitted through the beamsplitter 44 for subsequent viewing as a virtual image or on a screen. Alternately, an optional auxiliary projection lens 18 can provide further projection means. The preferred beamsplitting surface on beamsplitter 44 is the side closest to the image source. This arrangement is compact, lightweight, requires no lateral LCD panel displacement and substantially eliminates the aberrations associated with the tilted beamsplitter even in the absence of an immersing prism, since the light which is transmitted through the beamsplitter is largely collimated and not substantially convergent or divergent. This embodiment is further separated from the prior art in that it comprises three separate projection systems rather than one projection system with three equal path lengths. The special curved dichroic mirror reflector assembly is constructed analogously to its flat counterparts, utilizing such wavelength selective reflectors as multilayer dielectrics, conformal volume holograms or cholesteric films. While the reflectors are shown as having comparable curvature, the invention is not restricted in this way. Similarly, variations are possible which contain additional optical elements, not shown, or which do not include the beamsplitter but retain the stacked dichroic curved mirrors.

Figure 10:
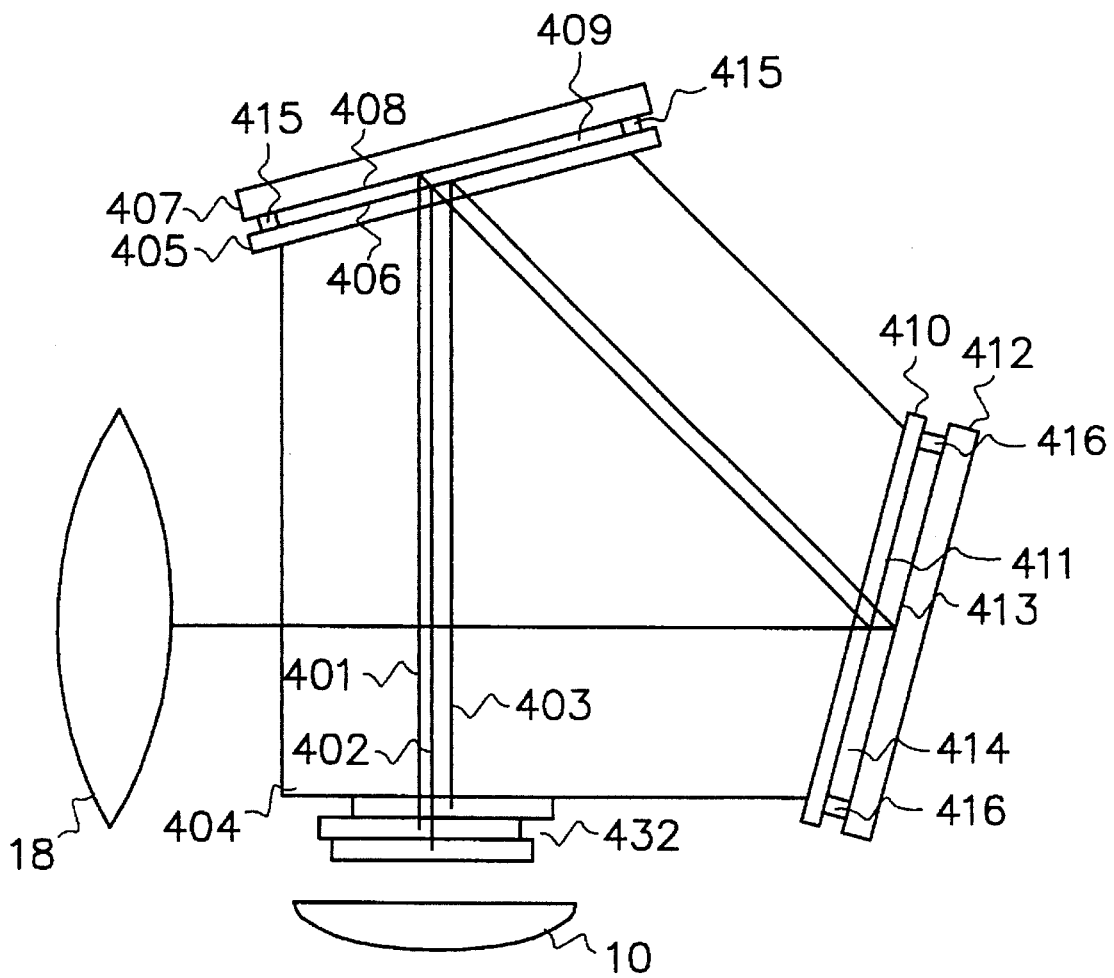
FIG. 10 is a top view of the seventh embodiment of the invention.

A seventh embodiment of the invention, shown in FIG. 10, illustrates how the invention can be practiced without requiring fabrication of thin flat mirror substrates or expensive coated prisms. In this example, which is similar in form to FIG. 5, light source 10 illuminates stacked LCD panels 432 to produce light paths 401, 402, and 403. In this embodiment, we consider the example of 401, 402 and 403 representing light paths for blue, green and red, respectively. The light rays enter prism 404 and pass through into substrate 405, optically bonded to prism 404 as shown. Spectrally selective mirror 406, on the opposite surface of 405, reflects green and red light but passes blue light. Substrate 407, is optically bonded to substrate 405, mirrored side 408 facing 406 but controllably spaced a predetermined distance away by spacers 415. The gap, 409, is filled with optical cement or other similar material. Blue light is reflected by mirror 408 and returns through 406. Red, green and blue light continue through prism 404 and are incident on substrates 410 and 412, having mirrors 411 and 413 and which are bonded together with spacers 416 in a similar fashion to the assembly of substrates 405 and 407. Spacers 415 and 416 will in general be of different thickness. In the current embodiment, green and blue are reflected by mirror 411, and red is transmitted by 411 but reflected by mirror 413. The combined rays then exit prism 404 and are imaged by optics 18.

This embodiment shows that the mirror separation can be controlled independently of the mirror thickness, which can be very beneficial, especially in the case of small mirror separations. As with the discussion in the context of FIG. 3, the mirror requirements can be further relaxed by including absorbing means in the spaced bond regions 409 and 414. This embodiment provides for the use of very simple and relatively inexpensive optical components in the prism and mirror assembly, while still effectively eliminating the parallax issues and not sacrificing resolution capability for the subtractive color LCD projector.

Figure 11:
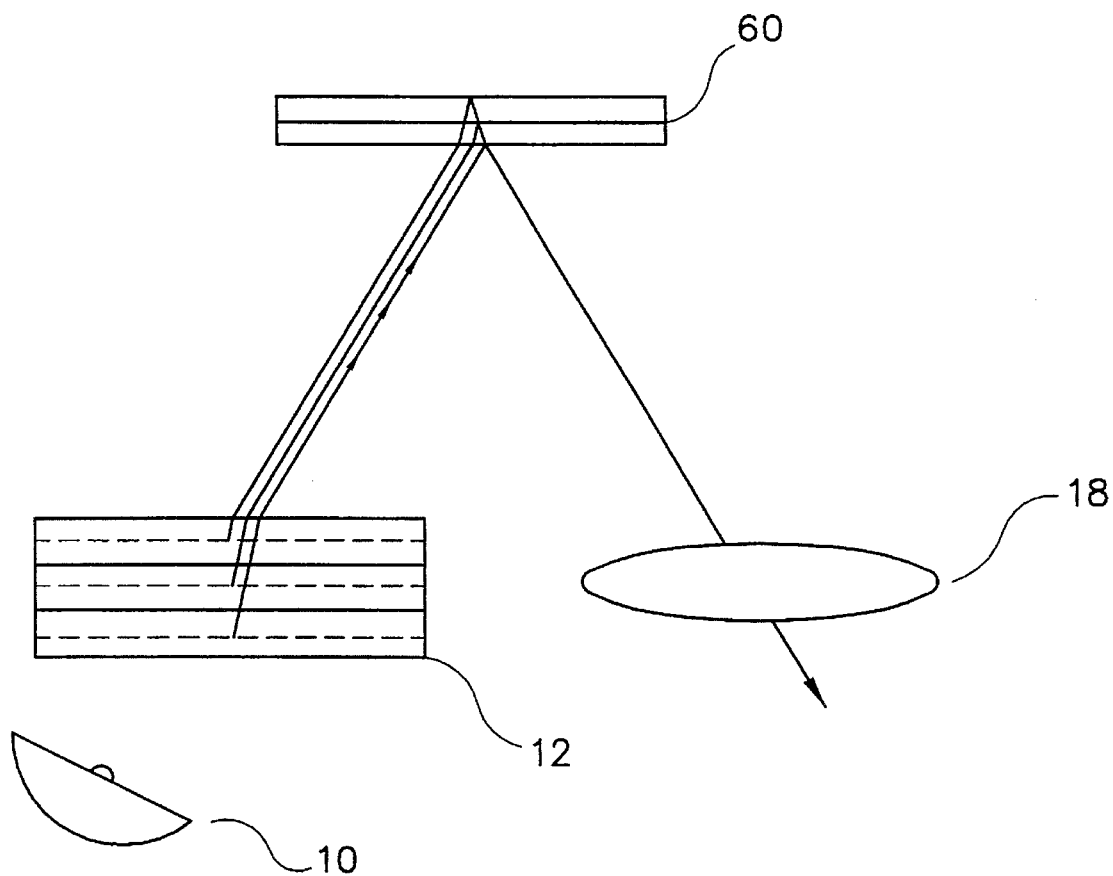
FIG. 11 is a top view of the eighth embodiment of the invention.

In the eighth embodiment of the invention, shown in FIG. 11, an off-axis projection approach is implemented. The light source 10 is set off at an angle rather than radiating directly onto the LCD panel assembly 12. The image created by LCD assembly 12 exits at an angle and is reflected by mirror assembly 60. The mirror assembly 60 is aligned parallel to the LCD assembly 12 and normal to the axis of the optics 18. The separation of the mirrors in mirror assembly 60 is such that it compensates for the optical path length differences created in the LCD assembly 12. The light is reflected by mirror assembly 60 and then passes out through optics 18 to be displayed. This embodiment offers the advantage of compactness as well as weight control. As yet a further option, the optical path prior to optics 18 can be immersed as well.

Figure 12:
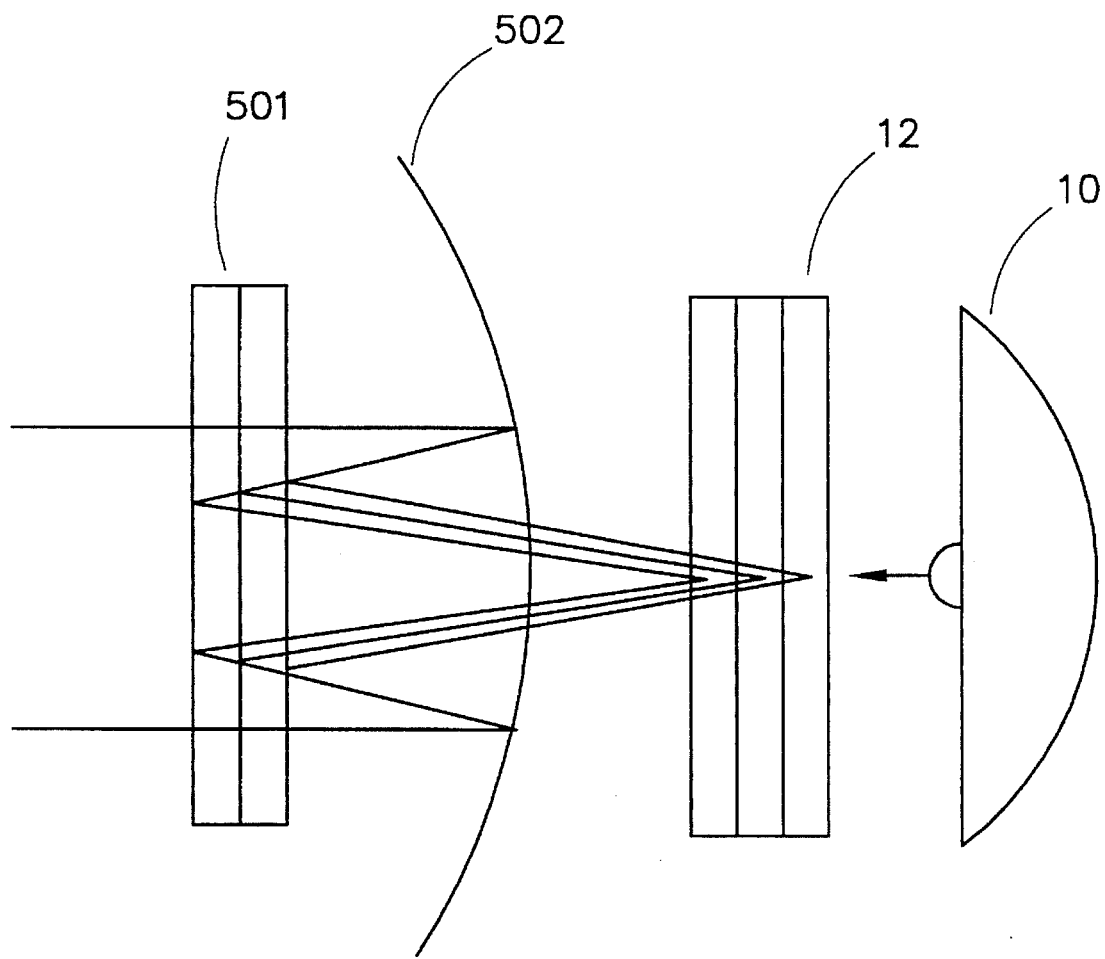
FIG. 12 is a top view of the ninth embodiment of the invention.

The ninth embodiment is shown in FIG. 12. This is an extremely compact projector where the mirror stack 501 consists of 3 individual spectrally pure but only partially reflecting mirrors. Imaging mirror 502 is partially reflecting and partially transmitting for all display wavelengths. Light source 10 illuminates LCD panel stack 12. Some portion of the light from 12 passes through mirror 502 and is incident on mirror assembly 501. Some portion of this light is reflected by the appropriate layers within the mirror stack, in line with earlier descriptions of operation of comparable mirror stacks. The mirror positions are adjusted to provide equal path lengths along the system axis before the reflected rays return to mirror 502. Upon reflection, 502 collimates or focuses the image rays for each of the color components. Some portion of this collimated light passes through mirror assembly 501 and is either viewed directly or projected by additional optics, which are not shown. Also not shown are additional measures, well known to those skilled in the art, for removing light which transmits all the way through on the first pass. Examples include off-axis arrangements or polarization control elements.

A variation of the embodiment in FIG. 11 is a system where element 501 is replaced by a single beamsplitter and element 502 is replaced by a curved mirror stack, similar to the mirror stack geometry shown in FIG. 8.

Yet another variation of the embodiment in FIG. 11 is possible if the output of the stacked LCD image source can be made in the form of circularly polarized light. If this is the case, the three mirrors in the mirror stack are preferentially constructed of crosslinked cholesteric liquid crystal silicone materials, which reflect one handedness of circular polarization for a given wavelength range and pass the other handedness as well as light outside the specified spectral band. In this variation, all of the light incident on 501 will be reflected appropriately, and the light returning from element 502, which will have changed handedness upon reflection from 502, will pass. This embodiment achieves improved transmittance while effectively eliminating parallax effects.

Figure 13:
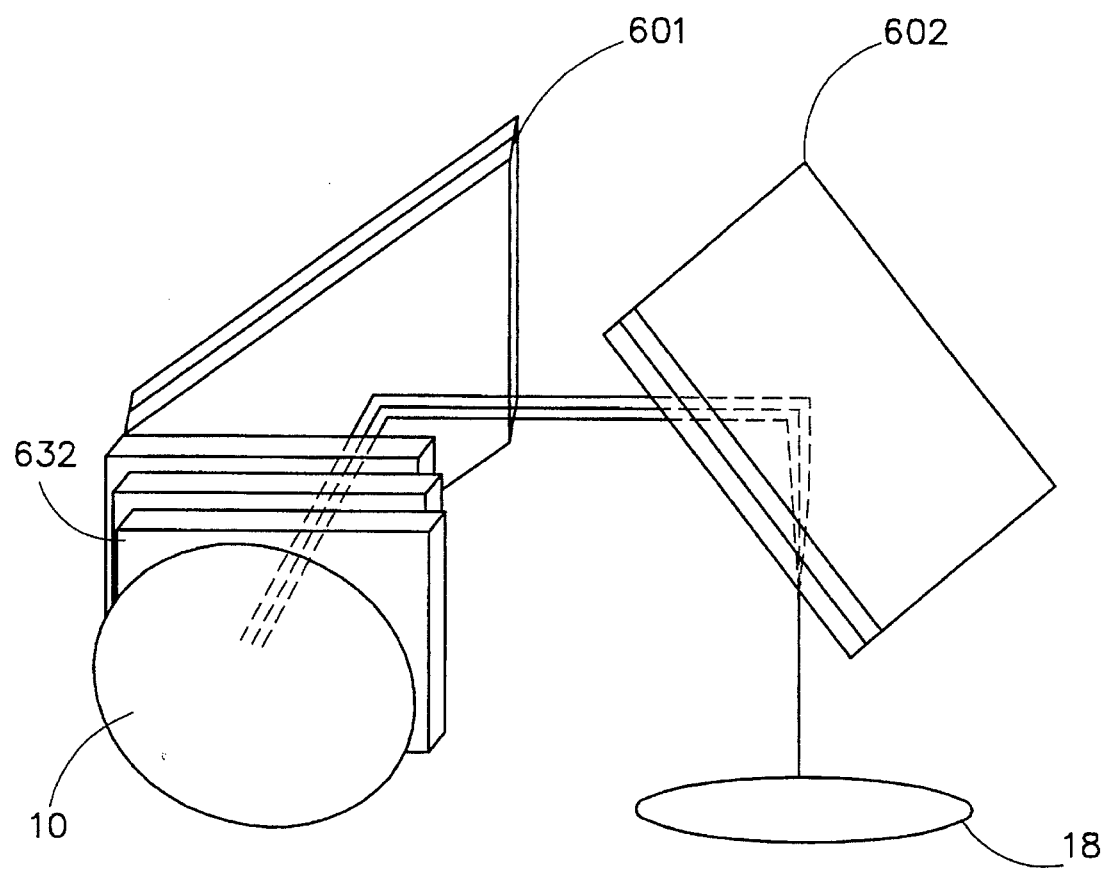
FIG. 13 is a 3-dimensional view of the tenth embodiment of the invention.

A tenth embodiment of the present invention is shown in FIG. 13. In this embodiment, the aberrational effects of the tilted mirror stack of the prior art are partially compensated by adding a complementary mirror stack which is similar in form but which folds the optical path orthogonally to the first fold. In this way much of the astigmatism introduced by the first stack can be compensated by the second. Compensation in this manner is highly effective, since the degree of compensation required is dependent upon the color band. In FIG. 12, light rays from 10 exiting from image source 632 are selectively reflected by first mirror stack 601. They are subsequently reflected by second mirror stack 602, which is similar in form to 601, in a way such that the plane containing the incident and reflected axial rays for mirror stack 601 is approximately perpendicular to the plane containing the incident and reflected axial rays for mirror stack 602. This is similar to the variation described above with respect to FIG. 3 in the absence of the prism. Here, a different and potentially more effective level of aberration compensation is achieved.

Figure 14:
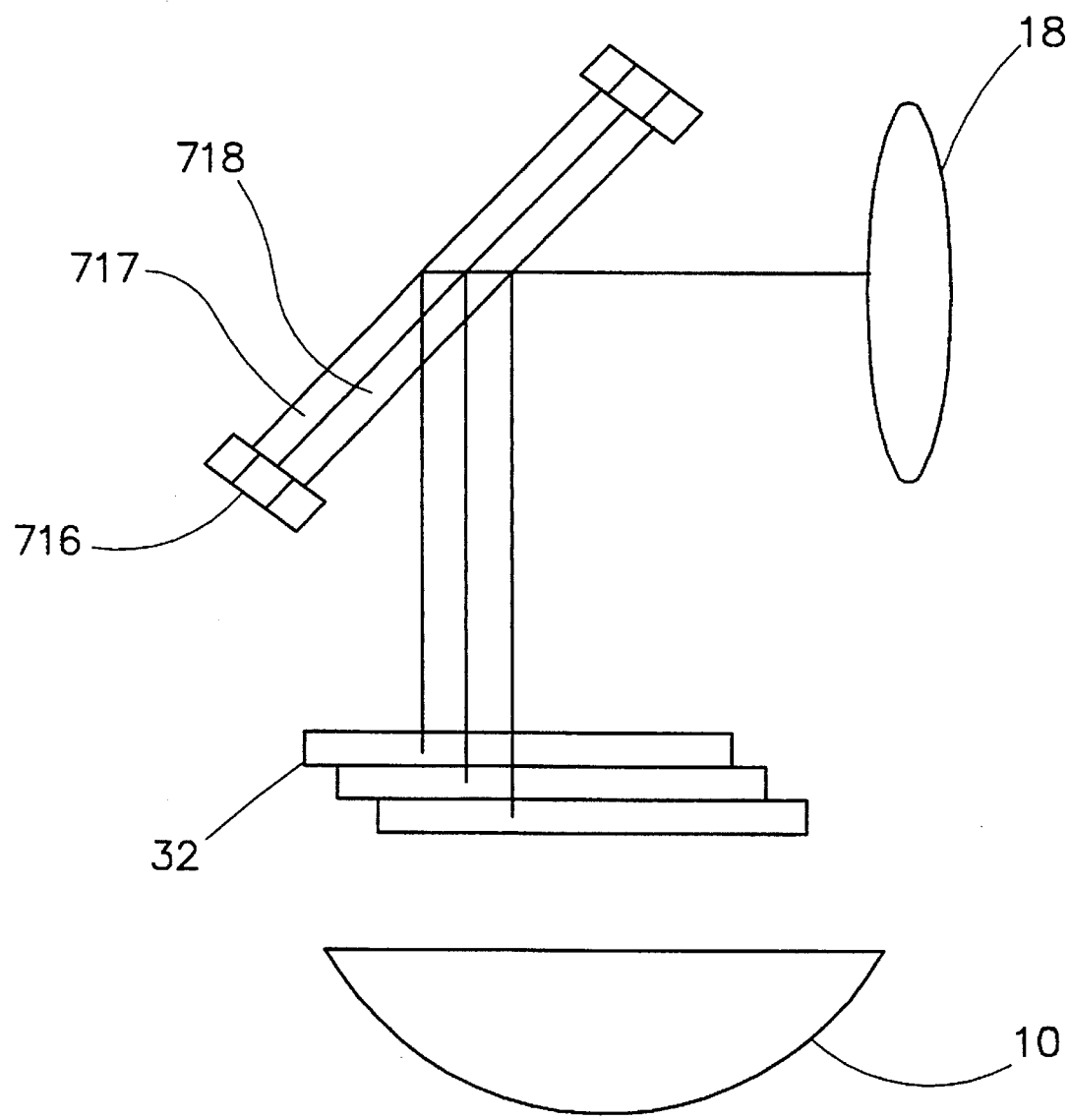
FIG. 14 is a top view of the eleventh embodiment of the invention.

An eleventh embodiment of the present invention is shown in FIG. 14. As with several other of the previously described embodiments, the dichroic mirrors are immersed in a medium having entrance and exit faces which are for the most part non-tilted with respect to the display panels and the axis of the optics. In FIG. 13, light from source 10 passes through stacked display panels 32 and is incident on dichroic mirror stack 716. Each of the wavelength-selective mirrors in 716 are very thin, such as tightly drawn pellicle membranes, and the gaps 717 and 718 between them are of the same index as the material between 716 and panels 32, preferably air. In this way, the thinness of the mirror substrates minimizes the refraction asymmetry in the path of the diverging rays. As described earlier, the separation of the dichroic pellicle mirrors is adjusted to compensate for the separation of the display panels. In this case, since the refractive index between the mirrors is in general quite different from the index n between the modulating layers, the separation between adjacent mirrors in a mirror stack at 45 degrees as depicted in FIG. 13 would be approximately $d/n\sqrt{2}$ where d is the separation between adjacent display panel modulating layers. For optimum performance the pellicles would require special coatings on both sides of each to minimize achromatic reflections. While it is perhaps not the least costly approach, this embodiment provides potentially very light weight and a quite compact geometry, while retaining high resolution capability.

The foregoing is a description of a novel and nonobvious High Resolution Subtractive Color Projection System. Additional variations and applications of the invention are identifiable, for example variations in the number, order or nature of the spectral components, use of alternate subtractive light valve technologies, or even application of the methods to stacked additive color emissive systems, such as stacked electroluminescent displays with transparent electrodes. The applicant does not intend to limit the invention through the foregoing description, but instead define the invention through the claims appended hereto.

I claim:

1. A color projection system comprising:

light producing means;

a plurality of stacked, high resolution display panels with individual picture elements which modulate light produced by said light producing means to form an image;

high resolution compensating means to compensate for parallax artifacts arising from said plurality of stacked high resolution display panels, wherein the high resolution compensating means includes refracting media which retracts the modulated light, the refracting media includes refracting surfaces which receives the modulated light such that all of said refracting surfaces are substantially non-tilted with respect to the plurality of stacked display panels; and high resolution optical focusing means to focus the modulated light and form a real or virtual composite image.

2. The color projection system of claim 1 wherein said high resolution display panels contain opaque matrix structures.

3. The color projection system of claim 1 wherein said high resolution display panels are active matrix liquid crystal panels.

4. The color projection system of claim 1 wherein there is zero lateral offset between each of the display panels.

5. The color projection system of claim 1 wherein said high resolution compensation means further includes a plurality of stacked dichroic mirrors, each of the mirrors reflects the modulated light in a particular spectral band.

6. The color projection system of claim 5 wherein said plurality of dichroic mirrors are incorporated into a transparent prism.

7. The color projection system of claim 6 wherein the plurality of dichroic mirrors are incorporated in two sides of said prism.

8. The color projection system of claim 7 wherein the prism is triangular to reflect the light from said plurality of display panels approximately 180 degrees.

9. The color projection system of claim 7 wherein there is zero lateral offset between each of said stacked display panels.

10. The color projection system of claim 6 wherein the prism is triangular and the plurality of dichroic mirrors are incorporated in one side of said prism to reflect light from said plurality of display panels approximately 90 degrees.

11. The color projection system of claim 5 wherein absorbing color filter means are interposed between the dichroic mirrors.

12. The color projection system of claim 5 wherein said plurality of dichroic mirrors are substantially parallel to said plurality of display panels and said high resolution optical focusing means has an axis of symmetry which is substantially perpendicular to said plurality of display panels so that only a portion of the modulated light from said plurality of display panels which is not parallel to the axis of focus is collected by said high resolution optical focusing means.

13. The color projection system of claim 5 wherein the separations between the dichroic mirrors are controlled independently of the mirror thickness.

14. The color projection system of claim 5 wherein each of the plurality of dichroic mirrors is partially transmissive in the particular spectral bands and said focusing means includes a curved reflective element.

15. The color projection system of claim 14 wherein the plurality of dichroic mirrors are cholesteric circular polarizing beamsplitters.

16. The color projection system of claim 1 wherein said high resolution of compensating means is comprised of:

a first plurality of dichroic mirrors.

17. The color projection system of claim 16 further comprising beamsplitting means positioned remote from said plurality of stacked high resolution display panels and in the path of the modulated light along the optical path between said plurality of display panels and said first plurality of dichroic mirrors.

18. The color projection system of claim 17 wherein the beamsplitting means reflects a portion of the modulated light 90 degrees to a first plurality of dichroic mirrors which are at a 90 degree angle with respect to the display panels.

19. The color projection system of claim 18 wherein the plurality of dichroic mirrors are curved to provide optical power during reflection of the modulated light.

20. The color projection system of claim 18 wherein the high resolution compensation memos is further comprised of:

a first quarter wave plate positioned between the beamsplitting means and the first plurality of dichroic mirrors;

polarization means for said beamsplitting means;

a second plurality of dichroic mirrors positioned parallel to the plurality of display panels and equal distance from the beamsplitting means and the first plurality of dichroic mirrors; and a second quarter wave plate positioned between the beamsplitting means and the second plurality of dichroic mirrors.

21. The color projection system of claim 17 wherein a first quarter wave plate is positioned between the beamsplitting means and the first plurality of dichroic mirrors, and wherein the beamsplitting means are polarizing beamsplitting means.

22. The color projection system of claim 17 wherein said beamsplitting means is a pellicle beamsplitter.

23. A color projection system comprising:

light producing means;

a plurality of stacked, high resolution display panels with individual picture elements in the path of said light to modulate the intensity of light produced by said light producing means to form an image; and a plurality of stacked, curved dichroic mirrors, wherein each of said mirrors selectively reflects and focuses the light modulated by one of the high resolution display panels, to form a real or virtual composite image of said plurality of stacked high resolution display panels.

24. A color projection system comprising:

light producing means;

a plurality of stacked, high resolution display panels with individual picture elements which modulate light produced by said light producing means to form an image;

high resolution compensating means to compensate for parallax artifacts arising from said plurality of stacked high resolution display panels, high resolution compensating means comprising:

a first plurality of dichroic mirrors; and a second plurality of dichroic mirrors, the second plurality of dichroic mirrors provides compensation for resolution limiting effects introduced by the first plurality of dichroic mirrors; and high resolution optical focusing means to focus the modulated light and form a real or virtual composite image.

25. A color projection system comprising:

light producing means;

a plurality of stacked, high resolution display panels with individual picture elements which modulate light produced by said light producing means to form an image;

high resolution compensating means to compensate for parallax artifacts arising from said plurality of stacked high resolution display panels, wherein said high resolution compensating means comprises a plurality of very thin stacked dichroic pellicle mirrors and the index of refraction between adjacent dichroic mirrors is the same as the index of refraction in the space separating the plurality of dichroic mirrors from said plurality of display panels; and high resolution optical focusing means to focus the modulated light and form a real or virtual composite image.

26. The color projection system of claim 25 wherein air is between the adjacent dichroic mirrors.

27. A color projection system comprising:

light producing means;

a plurality of stacked, high resolution display panels with individual picture elements which modulate light produced by said light producing means to form an image;

high resolution compensating means to compensate for parallax artifacts arising from said plurality of stacked high resolution display panels, wherein said high resolution compensation means includes an optical collection angle sufficiently large to average multiple angular interference fringes arising from the passage of uncollimated rays through the plurality of display panels; and high resolution optical focusing means to focus the modulated light and form a real or virtual composite image; and wherein a numerical aperture corresponding to the optical collection angle is approximately 2np/D or greater, wherein is the refractive index of the medium between successive pairs of the plurality of display panels, p is the distance, in millimeters, between adjacent pixels within each of the display panels, and D is the largest separation, in millimeters, between any two of the plurality of display panels.

28. A color projection system comprising:

light producing means;

a plurality of stacked, high resolution display panels with individual picture elements which modulate light produced by said light producing means to form an image;

high resolution compensating means to compensate for parallax artifacts arising from said plurality of stacked high resolution display panels, wherein said high resolution compensation means includes an optical collection angle sufficiently large to average multiple angular interference fringes arising from the passage of uncollimated rays through the plurality of display panels; and high resolution optical focusing means to focus the modulated light and form a real or virtual composite image; and wherein:

the optical collection angle is defined by the focal length of the focusing means and the pupil diameter of an observer's eye; and a numerical aperture corresponding to the optical collection angle is approximately 2np/D or greater, where n is the refractive index of the medium between successive pairs of the plurality of display panels, p is the distance, in millimeters, between adjacent pixels within each of the display panels, and D is the largest separation, in millimeters between and two of the plurality of display panels.

29. A color projection system comprising:

light producing means, wherein light produced is substantially uncollimated;

a plurality of stacked, high resolution display panels with individual picture elements which modulate light produced by said light producing means to form an image;

high resolution compensating means to compensate for parallax artifacts arising from said plurality of stacked high resolution display panels, wherein said high resolution compensation means includes an optical collection angle sufficiently large to average multiple angular interference fringes arising from the passage of uncollimated rays through the plurality of display panels; and high resolution optical focusing means to focus the modulated light and form a real or virtual composite image; and wherein the optical collection angle is defined by the focal length of the focusing means and the pupil diameter of an observer's eye.

30. The color projection system of claim 29 wherein the focusing means provide a virtual image to the observer's eye.

31. The color projection system of claim 30 wherein a cone of light rays is identified within the optical collection angle, and said cone of light rays varies as a function of position of the observer's eye.

32. A color projection system comprising:

light producing means, wherein light produced is substantially uncollimated;

a plurality of stacked, high resolution display panels with individual picture elements which modulate light produced by said light producing means to form an image;

high resolution compensating means to compensate for parallax artifacts arising from said plurality of stacked high resolution display panels, wherein said high resolution compensation means includes an optical collection angle sufficiently large to average multiple angular interference fringes arising from the passage of uncollimated rays through the plurality of display panels; and high resolution optical focusing means to focus the modulated light and form a real or virtual composite image; and wherein at least one of the plurality of display panels is misaligned from the other display panels.

* * * * *